July 21, 1964          A. J. HORNFECK ETAL          3,141,994
SERIES FILAMENT CIRCUIT FAILURE INDICATOR
Filed May 2, 1960

INVENTORS
ANTHONY J. HORNFECK
AND JOHN R. LOUIS
BY
John F. Luhrs
ATTORNEY

United States Patent Office 3,141,994
Patented July 21, 1964

3,141,994
SERIES FILAMENT CIRCUIT FAILURE
INDICATOR
Anthony J. Hornfeck, South Euclid, and John R. Louis, Cleveland, Ohio, assignors to Bailey Meter Company, a corporation of Delaware
Filed May 2, 1960, Ser. No. 26,040
1 Claim. (Cl. 315—96)

This invention relates to apparatus for manifesting failure of an electric circuit or component therein such as a filament of an electron discharge tube.

In the past several methods have been employed to indicate the condition of an electric circuit such as a filament circuit for one or more electron discharge tubes. Usually incandescent light bulbs or relays are connected in series with the filaments to become deenergized upon failure of the circuit or a filament. The use of such indicating means has been limited due to the fact that the serially connected light bulb or relay is also subject to failure, and it is possible that the filament circuit will be broken as a result of failure of the indicating means. Also, in the case of a filament circuit, such an indicating means is objectionable due to the increased electrical impedance in the circuit.

We have found that the characteristics of a transformer and neon bulb may be used advantageously in an electric circuit to provide a manifestation of component failure without an objectionable decrease in reliability of the circuit. In a preferred embodiment of the invention the primary winding of a transformer is connected in series in a filament circuit, and a low impedance indicating device such as a neon bulb is connected across the secondary winding of the transformer to be energized thereby. With this arrangement the transformer has a negligible circuit impedance and does not affect the normal operation of the filament circuit.

It is therefore a principal object of the invention to manifest failure of an electric circuit or component without impairing the reliability of the circuit or component.

Another object of the invention is to provide a circuit failure indicator of negligible circuit impedance.

Figure 1:
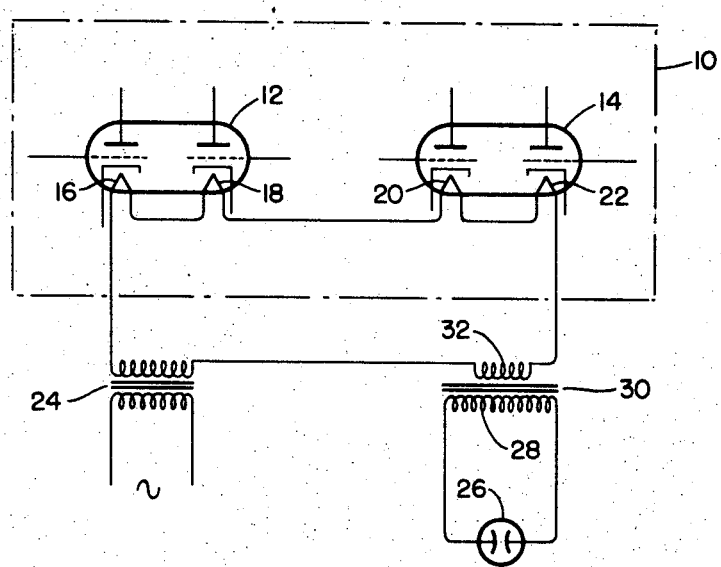
Figure 2:
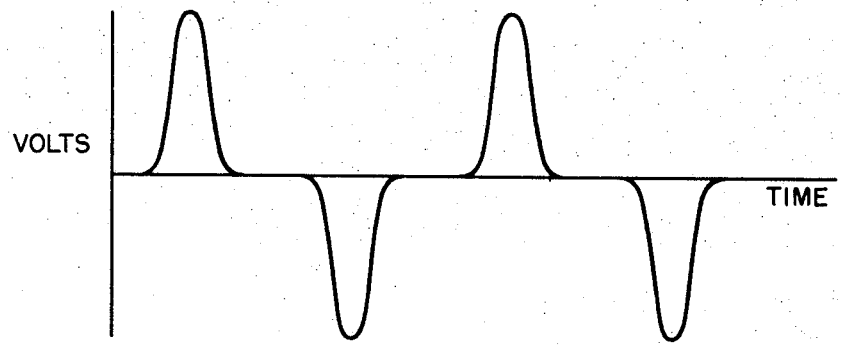
Figure 3:
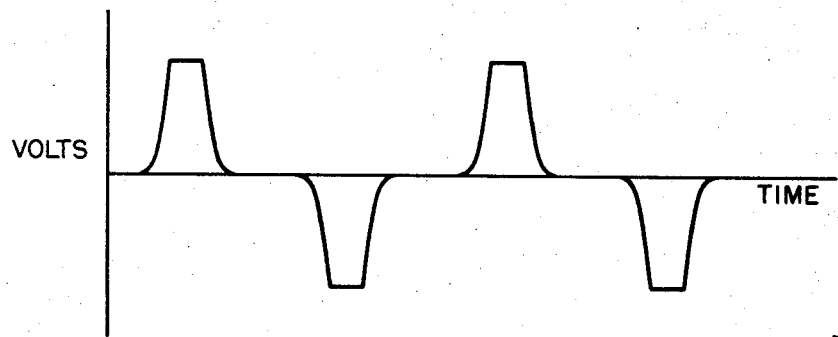

Other objects and advantages will become apparent from the following description taken in connection with the accompanying drawing wherein:

FIG. 1 is a schematic illustration of a preferred embodiment of the invention; and FIGS. 2 and 3 are graphical illustrations of voltage waveforms produced at one point in the circuit of FIG. 1.

Referring more particularly to the drawing, there is shown in block diagram an electronic circuit 10 which may comprise the amplifier circuit disclosed and claimed in copending application Serial No. 770,710 filed on October 30, 1958 by Harold H. Koppel et al., now Patent 3,080,531, issued March 5, 1963. As shown schematically the amplifier circuit 10 comprises a pair of double triode vacuum tubes indicated generally by the reference numerals 12 and 14 respectively. The tubes 12 and 14 are conventional in structure and each triode section comprises an anode, a grid, and a cathode. In addition, the triode sections are provided with standard 6 volt filaments 16, 18, 20 and 22 respectively which are connected in series across the secondary winding of a supply transformer 24. The primary winding of transformer 24 is coupled to a suitable source of alternating voltage as indicated schematically on the drawing. The secondary voltage of transformer 24 is preferably 24 volts to establish the required 6 volt drop across each of the filaments 16, 18, 20 and 22.

Due to the series circuit arrangement of the filaments 16, 18, 20 and 22 failure of any one of the filaments will break the energizing circuit for the other filaments rendering the amplifier inoperative. In accordance with the objects of our invention we provide means for manifesting the absence of current flow through the filament circuit. This means includes a neon bulb 26 which is adapted to be energized when the filament circuit is operative but deenergized when the filament circuit is inoperative.

The neon bulb 26 is connected across the secondary winding 28 of a transformer 30 the primary 32 of which is connected in series with the tube filaments 16, 18, 20 and 22 in the energizing circuit. The transformer 30 is preferably provided with a high secondary to primary turns ratio. In the particular filament circuit illustrated a turns ratio of approximately 570 to 1 was utilized.

It is a known fact that the initial energizing voltage of a neon bulb must be substantially higher than the operating voltage thereof to effect ionization of the gas in the bulb. Thus to initially effect energization of a neon bulb an initially high voltage is necessary while energization may be substantially maintained with a lower operating voltage. While the invention is not limited to a neon bulb having a particular energizing or operating voltage, satisfactory operation of the circuit disclosed occurred when a bulb having an energizing voltage of approximately 90 volts and an operating voltage of approximately 70 volts was employed.

The above characteristic of a neon bulb is utilized to advantage in connection with the characteristic high initial no load saturation voltage of a transformer to provide a filament failure manifestation means having minimum circuit impedance. More particularly, it is well known that the impedance of the primary winding of a transformer is proportional to the permeability of the transformer core which decreases upon saturation of the transformer. Thus, when saturation occurs the impedance of the primary winding decreases causing the flux density to remain substantially constant and the magnetizing current to increase sharply. The voltage across the secondary winding of the transformer is proportional to the rate of change of the flux density, and thus the magnitude of the secondary voltage will increase sharply at the no load saturation condition.

The result of this saturation phenomena is that under no load conditions, a voltage is produced across the secondary of the transformer having a wave form as illustrated in FIG. 2 with a high peak magnitude. When a load is subsequently applied to the secondary winding, the saturation condition will no longer exist and the voltage across the secondary winding will have the wave form as illustrated in FIG. 3 with a substantially lower peak voltage.

It has been found that the peak voltage produced during the no load saturation condition may exceed the normal voltage produced when a load is applied to the secondary by as much as 30 percent. Thus, if the secondary voltage when a load is applied is approximately 70 volts, the peak no load saturation voltage will be in the order of 90 volts.

In operation of the circuit disclosed in FIG. 1 a turns ratio of the transformer 30 is employed which will produce a secondary voltage of approximately 70 volts when a load is applied to secondary winding 28. To initially energize the neon bulb 26 when power is supplied to the amplifier 10, a voltage across secondary winding 28 of approximately 90 volts is required as previously mentioned. Prior to energization of the bulb 26 the secondary winding 28 is in effect under no load conditions due to the lack of continuity of the secondary circuit. Thus, when power is initially supplied to the amplifier 10 saturation of the transformer 30 will occur producing a voltage across secondary winding 28 exceeding the normal operating voltage by approximately 30 percent and having a magnitude of approximately 90 volts causing energization of the bulb 26.

Energization of the bulb 26 will continue as long as there is continuity in the energizing circuit for the filaments 16, 18, 20 and 22. If a filament should fail the energizing circuit will be broken causing deenergization of the bulb 26 to manifest the failure.

The advantages of the circuit will now be apparent. It is to be noted that by utilizing the no load saturation voltage to energize the neon bulb 26, the size of the transformer 30 need only be sufficient to supply the voltage necessary under load conditions to maintain energization of the bulb 26. This feature coupled with the normal low impedance of a neon bulb results in only a very slight negligible increase in the circuit impedance of the filament circuit as compared to prior methods of manifesting filament failure. In addition, failure of the neon bulb 26 will not result in failure of the filament circuit as in the case of a relay or incandescent lamp connected in series with the filaments.

One of the most important advantages of the invention is the fact that the filament power supply transformer 24 may be of standard size due to the negligible impedance of the transformer 30 in the filament circuit. This impedance has been found to be negligible even in a circuit employing only a single 6 volt filament. In the 24 volt filament circuit illustrated in FIG. 1 the impedance of the primary winding 32 was found to be less than 0.1 percent of the total circuit impedance.

While only one embodiment of the invention has been herein shown and described, it will be apparent to those skilled in the art that many changes may be made in the construction and arrangement of parts without departing from the scope of the invention as defined in the appended claim.

What we claim as new and desire to secure by Letters Patent of the United States is:

Apparatus for indicating the condition of a vacuum tube circuit having filaments in series comprising, a source of current for said filaments, having a voltage not substantially greater than the sum of the required filament voltages, a transformer having a primary winding of very low operating impedance under load connected in series in said circuit and a secondary winding having a high secondary to primary turns ratio with said primary winding, said transformer being constructed to produce under no load saturation conditions a high peak voltage across the secondary winding and a substantially lower voltage when a load is applied to said secondary winding and a neon lamp connected across said secondary winding and having an initial energization voltage rating not greater than the peak saturation voltage across said secondary winding during normal operating condition of the circuit and a lower operating voltage not greater than the load voltage across said secondary winding during normal operation of the circuit.

References Cited in the file of this patent

UNITED STATES PATENTS

| | | |
|---|---|---|
| 1,765,396 | Betts | June 24, 1930 |
| 2,118,483 | Woodman | May 24, 1938 |
| 2,431,151 | Tellegen | Nov. 18, 1947 |
| 2,859,384 | Kraft | Nov. 4, 1958 |

FOREIGN PATENTS

| | | |
|---|---|---|
| 78,118 | Austria | Sept. 10, 1919 |
| 355,815 | Italy | Jan. 18, 1938 |
| 582,038 | Great Britain | Nov. 1, 1946 |
| 264,741 | Switzerland | Feb. 16, 1950 |
| 290,343 | Switzerland | Aug. 1, 1953 |
| 874,841 | Great Britain | Aug. 10, 1961 |